(No Model.)
M. SWENSON.
METHOD OF AND JACKET FOR COVERING CYLINDRICAL COTTON BALES.
No. 585,242. Patented June 29, 1897.
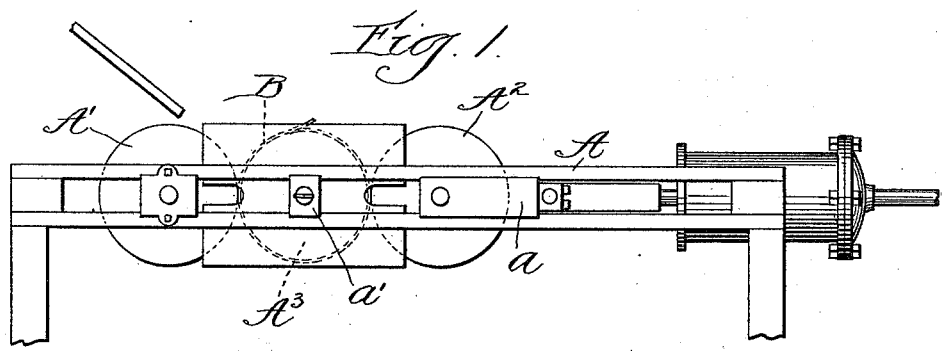
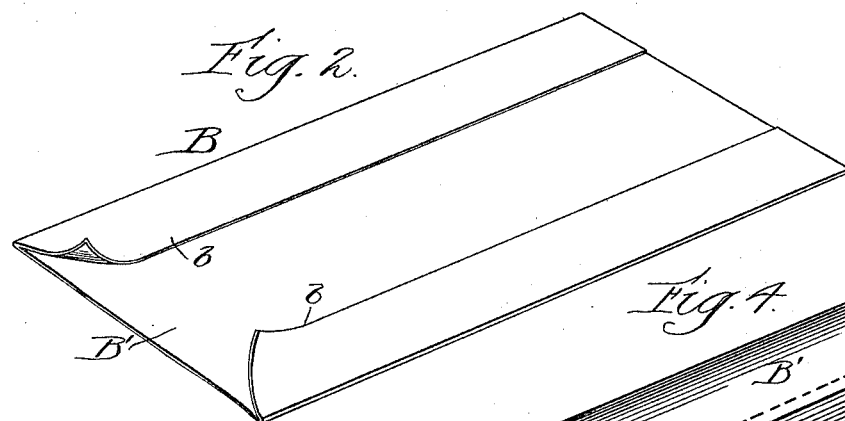
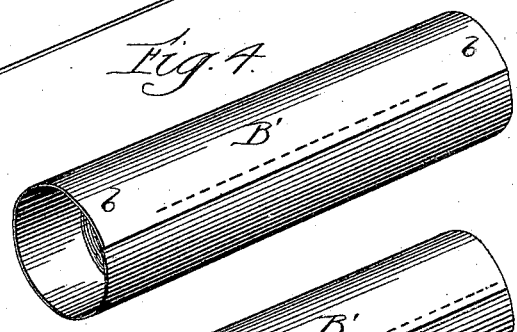
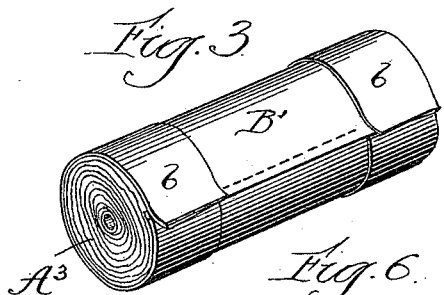
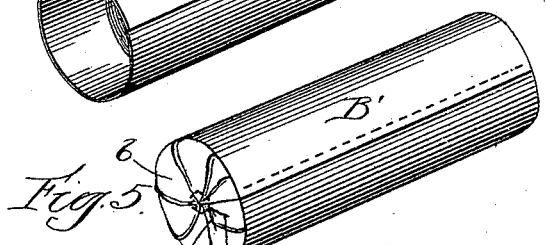
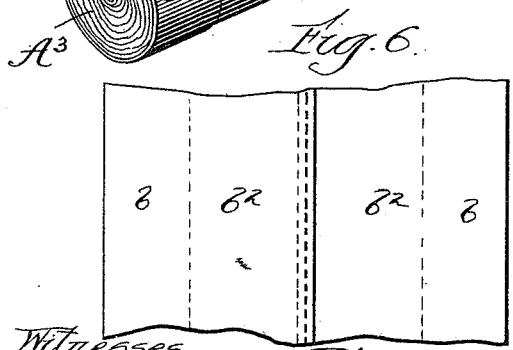
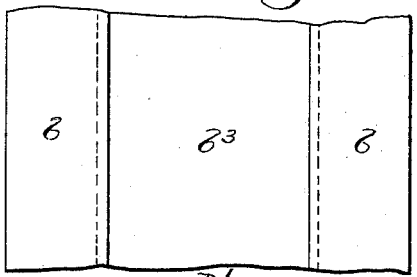
Witnesses
Wm. J. Henning
Byron B. Carter
Inventor
Magnus Swenson,
by Geo. T. Waldo,
his Atty.
THE NORRIS PETERS CO., PHOTO-LITHO., WASHINGTON, D. C.

UNITED STATES PATENT OFFICE.

MAGNUS SWENSON, OF CHICAGO, ILLINOIS.

METHOD OF AND JACKET FOR COVERING CYLINDRICAL COTTON-BALES.

SPECIFICATION forming part of Letters Patent No. 585,242, dated June 29, 1897.

Application filed October 16, 1896. Serial No. 609,145. (No model.)

*To all whom it may concern:*

Be it known that I, MAGNUS SWENSON, a citizen of the United States, and a resident of Chicago, in the county of Cook and State of Illinois, have invented a novel Method or Process of Covering Cylindrical Cotton-Bales and an Improved Jacket or Covering Therefor, of which the following is a specification.

This invention relates to a novel method or process of covering cylindrical cotton-bales and relates particularly to a novel method or process of covering cylindrical cotton-bales formed by winding a bat of cotton into a cylindrical bale between the compression-rolls of a press of the type comprising relatively movable compression-rolls, revolubly mounted in lateral frame-sections, in presses of which type the ends of the bale are covered or hidden by the parts of the press, so as to be inaccessible in order to cover the same. The matter of covering bales of this kind has been the subject of much study and experiment and many different forms of covering have been devised and used. According to the best practice in use prior to my invention the sides and ends of the bale have been covered as separate operations and by means of separate and detached side and end coverings, the sides of the bale being covered while the bale is in the press and the ends after said bale is discharged therefrom. Jackets or coverings of this kind are objectionable, however, owing to the inconvenience of applying the same to the bale.

The preferable covering or jacket for cylindrical bales consists of a single piece of suitable material comprising coverings for the sides and both ends of the bale. Heretofore it has been impossible to use this form of covering for bales made in a press of the type described, as prior to my invention no method had been discovered or devised for applying such a jacket or covering thereto. The object of my invention is, therefore, to provide a method or process of applying a jacket or covering comprising attached coverings for the sides and ends of the bale to cylindrical cotton-bales formed in presses of the type described, whereby the sides of the bale may be covered before the bale is discharged from the press and the ends thereof covered, as a separate step of the process, after said bale has been discharged from the press.

To this end my invention consists of the novel method or process hereinafter described and claimed.

In the accompanying drawings I have illustrated my novel method or process as practiced in connection with the operation of a press of the type described.

Figure 1 is a press of the type in connection with the operation of which my novel method of covering bales is intended to be practiced. Fig. 2 shows the bale-covering and the manner of folding the same, so that it may be applied to a bale in the press. Fig. 3 is a bale as it is discharged from the press. Fig. 4 shows the end coverings stripped from the sides of the bale. Fig. 5 shows the bale finished; and Figs. 6 and 7 illustrate different forms of jackets or coverings, applying which involves the practice of my invention.

Referring now to the drawings, A is the frame of a cotton-press; A', a compression-roll mounted in stationary bearings therein; $A^2$, a compression-roll mounted in sliding bearing-blocks $a$; $A^3$, a bale of cotton formed between said compression-rolls A' $A^2$ on a core-roll supported in sliding bearing-blocks $a'$; and B designates the covering for the bale, which consists, preferably, of a single piece of suitable flexible material, as gunny-cloth or the like, which is wide enough to cover the sides and both ends of said bale.

The bale $A^3$, having attained desired size, is covered in the following manner: The lateral edges $b$ of the covering B, which are designed for covering the ends of the bale, are first folded back upon the middle portion B' of said covering B, as clearly shown in Fig. 2 of the drawings. The covering B, which in its folded condition is of a width substantially equal to the length of the bale, is then wound tightly around said bale in such manner that the folds $b$ will be on the outside thereof. This can be conveniently done while the bale is in the press by operating said press slowly and guiding the end of said covering around said bale, at the same time maintaining a strong tension on said covering. This can be done satisfactorily by hand without the use of mechanism. The sides of the bale being thus covered, the meeting ends of said covering B' are sewed or are otherwise secured together, leaving the ends of the bale uncovered. The bale is then discharged from the press. The folds $b$ are stripped from the sides of the bale, so as to extend over the ends of the bale, and are then gathered together and secured over the ends of said bale, so as to cover the same, which may be done conveniently by means of gathering-strings $b'$ therein. The bale is then a finished commercial bale.

The covering for each bale will preferably be drawn from a roll of the desired material as it is wanted for use, thus providing convenient means for maintaining the desired tension on said covering.

While I consider the form of jacket heretofore described as being preferable, the form of said jacket may be variously modified and its application to the bale still involve the practice of my invention. In Figs. 6 and 7 of the drawings I have shown two such modifications, which I will now describe.

In the form of covering shown in Fig. 6 the side covering B' instead of forming an integral piece consists of two pieces $b^2$, which overlap each other, the end coverings $b$ being made integral with or attached to the outer edges thereof. It is obvious that more than two pieces $b^2$ may be used, if for any reason desired.

In the modification shown in Fig. 7 the covering for the sides of the bale consists of a single piece $b^3$ of sulfite fiber or the like, to the lateral edges of which are secured the flexible end coverings $b$.

I claim—

1. The method or process of applying a jacket or covering, comprising attached coverings for the sides and ends thereof, to a cylindrical cotton-bale, which consists in first turning or folding the end coverings back upon the side covering, winding said folded covering tightly around the sides of the bale in such manner that the folded portions or end coverings will be exposed, securing the meeting ends of said covering together, stripping the folded end coverings from the sides of the bale and securing them over the ends thereof, substantially as described.

2. A jacket for cylindrical cotton-bales, comprising a covering for the sides of the bale and a flexible covering for the ends of said bale, said end coverings being attached to the edges of said side covering and being adapted to be folded back upon said side covering preliminary to the application of the jacket to the bale, substantially as described.

3. A jacket for cylindrical cotton-bales, comprising an integral covering for the sides of the bale and flexible coverings for the ends of said bale, said end coverings being attached to the edges of said side covering and being adapted to be folded back upon said side covering preliminary to the application of the jacket to the bale, substantially as described.

4. A jacket for cylindrical cotton-bales consisting of a single piece of suitable flexible material and comprising a covering for the sides of the bale and coverings for the ends of the bale, said end coverings being adapted to be folded back upon said side covering preliminary to the application of the jacket to the bale, substantially as described.

In testimony that I claim the foregoing as my invention I have hereunto set my hand this 26th day of September, 1896.

MAGNUS SWENSON.

Witnesses:
B. A. JOHNSTON,
J. H. GIBSON.